United States Patent
Bringe et al.

(10) Patent No.: US 9,723,954 B2
(45) Date of Patent: Aug. 8, 2017

(54) COMBINATION GRIDDLE AND TEPPANYAKI COOKING UNIT FOR A HOUSEHOLD COOKING APPLIANCE

(71) Applicant: BSH Home Appliances Corporation, Irvine, CA (US)

(72) Inventors: William Bringe, Powell, TN (US); John Freeman, Knoxville, TN (US); Samuel Harward, Knoxville, TN (US); Michael Rutherford, Duff, TN (US)

(73) Assignee: BSH Home Appliances Corporation, Irvine, CA (US)

( * ) Notice: Subject to any disclaimer, the term of this patent is extended or adjusted under 35 U.S.C. 154(b) by 767 days.

(21) Appl. No.: 13/845,312

(22) Filed: Mar. 18, 2013

(65) Prior Publication Data

US 2014/0261009 A1    Sep. 18, 2014

(51) Int. Cl.
*A47J 37/06*    (2006.01)

(52) U.S. Cl.
CPC ......... *A47J 37/067* (2013.01); *A47J 37/0676* (2013.01); *A47J 37/0682* (2013.01)

(58) Field of Classification Search
CPC ... A47J 37/067; A47J 37/0676; A47J 37/0682
USPC ........... 99/331, 422; 219/436, 441, 442, 542
See application file for complete search history.

(56) References Cited

U.S. PATENT DOCUMENTS

| | | | | |
|---|---|---|---|---|
| 3,317,709 A | * | 5/1967 | Beasley | A47J 37/0676 219/448.17 |
| 5,522,308 A | * | 6/1996 | Kayashima | A47J 27/62 219/436 |
| 5,676,043 A | | 10/1997 | Best | |
| 8,065,997 B2 | | 11/2011 | Lee et al. | |
| 8,084,719 B2 | | 12/2011 | Ciancimino et al. | |
| 2005/0000957 A1 | * | 1/2005 | Jones | A47J 27/62 219/450.1 |
| 2006/0163242 A1 | * | 7/2006 | Ciancimino | A47J 37/0676 219/450.1 |
| 2010/0199857 A1 | * | 8/2010 | Storiz | A47J 37/067 99/422 |

OTHER PUBLICATIONS

Neff, Teppan Yaki N54K40N0, Online: Cooking. DesignFurnitureFurnishing.com, 2010.
Gaggenau Hausgeräte GmbH, Gaggenau 15" Teppan Yaki, Model VP421610, Online: AJMadison.com.
Gaggenau, Zoneless induction cooking, CX 480, Online: BeautifulKitchens.wordpress.com, Apr. 6, 2011.

* cited by examiner

*Primary Examiner* — Thien S Tran
(74) *Attorney, Agent, or Firm* — Michael E. Tschupp; Andre Pallapies

(57) ABSTRACT

A combination griddle and teppanyaki cooking unit for a household cooking appliance or stand-alone cooking appliance is provided in which the combination griddle and teppanyaki cooking unit includes a cooking surface, a first heating unit for heating a first portion of the cooking surface, and a second heating unit for heating a second portion of the cooking surface, wherein the first heating unit and the second heating unit are selectively operable to uniformly heat an entire area of the cooking surface in a griddle mode of operation and to concentrate a greater amount of heat in a first area of the cooking surface than in a second area of the cooking surface in a teppanyaki mode of operation.

30 Claims, 6 Drawing Sheets

COMBINATION GRIDDLE AND TEPPANYAKI COOKING UNIT FOR A HOUSEHOLD COOKING APPLIANCE

FIELD OF THE INVENTION

The present invention is directed to a combination griddle and teppanyaki cooking unit for a household appliance, a surface cooking module having such a combination griddle and teppanyaki cooking unit, and a household cooking appliance having a combination griddle and teppanyaki cooking unit.

BACKGROUND OF THE INVENTION

Household cooking appliances are increasingly becoming multi-modal in that these appliances typically now incorporate multiple different types of cooking functions. For example, a household cooking appliance may include one or more of a steam oven, a warming drawer, a convection oven, gas burners, a griddle, a grill, a teppanyaki grill, an induction heating element, or the like. To provide these multiple different types of cooking functions, a surface cooking unit must be installed in a top of the household appliance to provide each of these different functions. For example, a separate surface cooking unit must be installed in a top of the household appliance to provide each of a gas burner, a griddle, a grill, a teppanyaki grill, an induction heating element, or the like, depending on the options selected by the customer or user.

SUMMARY OF THE INVENTION

The present invention, as illustrated for example in the exemplary embodiments, provides a combination griddle and teppanyaki cooking unit for a household cooking appliance, the combination griddle and teppanyaki cooking unit comprising a cooking surface, a first heating unit for heating a first portion of the cooking surface, and a second heating unit for heating a second portion of the cooking surface, wherein the first heating unit and the second heating unit are selectively operable to uniformly heat an entire area of the cooking surface in a griddle mode of operation and to concentrate a greater amount of heat in a first area of the cooking surface than in a second area of the cooking surface in a teppanyaki mode of operation.

The present invention also provides a household cooking appliance comprising a combination griddle and teppanyaki cooking unit including a cooking surface, a first heating unit for heating a first portion of the cooking surface, and a second heating unit for heating a second portion of the cooking surface, wherein the first heating unit and the second heating unit are selectively operable to uniformly heat an entire area of the cooking surface in a griddle mode of operation and to concentrate a greater amount of heat in a first area of the cooking surface than in a second area of the cooking surface in a teppanyaki mode of operation.

The present invention also provides a combination griddle and teppanyaki household cooking appliance comprising a cooking surface, a first heating unit for heating a first portion of the cooking surface, and a second heating unit for heating a second portion of the cooking surface, wherein the first heating unit and the second heating unit are selectively operable to uniformly heat an entire area of the cooking surface in a griddle mode of operation and to concentrate a greater amount of heat in a first area of the cooking surface than in a second area of the cooking surface and provide a temperature gradient extending outward from the first area of the cooking surface to edges of the cooking surface in a teppanyaki mode of operation.

In this way, the present invention provides a combination griddle and teppanyaki cooking module for a household appliance, a household appliance having a combination griddle and teppanyaki cooking module, and a combination griddle and teppanyaki household cooking appliance (e.g., a stand-alone appliance) that increase surface cooking flexibility by enabling users to operate the cooking appliance as either a griddle or a teppanyaki grill, thereby eliminating the need to limit the appliance to one or the other of a griddle or a teppanyaki grill or to devote space, for example, in the appliance or on a counter top to multiple cooking units or modules for providing a separate griddle and teppanyaki grill. Furthermore, the present invention provides flexible cooking options from a single cooking unit, thereby saving space in the kitchen compared to having two separate cooking appliance dedicated to each type of cooking, or saving space on the cooking appliance compared to having two separate cooking units on the appliance being dedicated to each type of cooking. The present invention also provides a single solution or option for users who desire either a griddle or a teppanyaki grill, or both, thereby reducing complexity in manufacturing household cooking appliances, for example, by reducing a number of different models of appliances needed to offer the griddle and teppanyaki grill operations.

Moreover, the present invention provides a cooking unit having a more durable surface suitable for teppanyaki grill operation that can selectively be operated in a griddle operation mode, thereby providing a griddle operation having a more durable surface (e.g., stainless steel, hard chrome, or some other temperature and scratch resistant material) than commonly provided for griddles. Additionally, the present invention can provide a grease/waste collection element, which may ordinarily be provided only with a griddle and not with a teppanyaki grill, thereby providing a teppanyaki grill operation that is more usable for household usage.

Prior to describing the exemplary embodiments in greater detail, and to provide a better understanding of the invention, this disclosure will first describe some of the problems with conventional cooking units or modules for household cooking appliances.

As explained above, to provide multiple different types of cooking functions, a separate surface cooking unit must be installed in a top of the household appliance to provide each of a gas burner, a griddle, a grill, a teppanyaki grill, an induction heating element, or the like, depending on the options selected by the customer or user.

Household appliances including a gas or electric powered griddle have become increasingly popular, and in some cases, may be offered as standard equipment on many models of cooking appliances. A standard griddle commonly provides even heat across an entire surface. A griddle commonly may be adjustable between temperatures of approximately 200° F. and 500° F. The griddle surface commonly is considered ideal for cooking large quantities of food which would otherwise be pan fried, such as, for example, eggs, bacon, sausage, pancakes, quesadillas, etc.

Additionally, household appliances including a Japanese style teppanyaki cooking surface have become increasingly popular. Teppanyaki cooking has been made popular by Japanese steakhouses which cook at a table in front of guests. A teppanyaki grill commonly includes a virtually indestructible surface made of, for example, stainless steel, hard chrome, or some other temperature and scratch resistant material. A teppanyaki grill typically provides concentrated heat at the center of the cooking surface with gradually decreasing temperatures towards the edges of the cooking surface. When cooking on a teppanyaki grill, a chef generally places ingredients at the center of the grill to begin cooking. Those items for which cooking is completed first (e.g., rice, eggs, vegetables, etc) are gradually moved away from the hotter center of the teppanyaki grill surface and the temperature of these items is maintained by placing these items around the warm edges of the teppanyaki cooking surface. Those items that require higher temperatures to cook (e.g., steak, shrimp, chicken, etc.) are kept near the center of the teppanyaki grill to continue cooking at high heat.

Because both types of cooking surfaces consume a considerable amount of space on the cooktop, a user commonly will have to choose between a standard griddle and a teppanyaki grill depending on the particular model of appliance. In instances in which both the griddle and teppanyaki grill are desirable to the user, the cooking appliance may be provided with two separate cooking units; a first cooking unit being the griddle and a second cooking unit being the teppanyaki grill, which commonly occupies up a large amount of available space on the cooktop and also may increase the costs of the appliance to the user. Commonly, a user's interests and cooking practices may change over time, and therefore, a user that selects a griddle may eventually find that they prefer to cook using a teppanyaki grill, or vice versa. As a result, some users may opt for a type of cooking surface that they eventually do not use, which may affect the user's satisfaction with the appliance. Other users may opt for both types of cooking surfaces and then find that they only use one or the other, which also may affect the user's satisfaction with the appliance. Still other users may opt not to obtain either type of the cooking surface because they fear that it is unlikely that they will have an interest in the particular type of cooking surface throughout the lifespan of the cooking appliance, which also may affect the user's satisfaction with the appliance.

To solve the foregoing problems and others, the present invention provides a cooking unit or appliance having a cooking surface that can be selectively operated as either a griddle or a teppanyaki grill. For purposes of this disclosure, a combination griddle and teppanyaki cooking unit refers to a cooking surface that can be selectively operated as a griddle or a teppanyaki grill. A griddle commonly provides even heating over the entire surface of the griddle. By contrast, a teppanyaki cooking surface typically includes a central hot cooking surface (e.g., a circular central hot cooking surface) that is surrounded by less hot (warm) areas, for example which may only be hot enough to keep food warm and not to further cook the food. A combination griddle and teppanyaki cooking unit can be configurable or adaptable such that a user can selectively operate the cooking surface in either a griddle mode or a teppanyaki mode.

The exemplary embodiments of a combination griddle and teppanyaki cooking unit can increase surface cooking flexibility provided by the appliance. For example, the exemplary combination griddle and teppanyaki cooking unit can selectively operate in a teppanyaki mode or a griddle mode, thereby enabling the customer or user to selectively cook food (e.g., Asian style stir-fry, etc.) on a teppanyaki grill or to alternatively cook food (e.g., traditional American foods such as bacon, eggs, or pancakes, etc.) on a griddle. Moreover, the combination griddle and teppanyaki cooking unit can provide both a teppanyaki mode and a griddle mode without consuming additional space on the cooktop as compared to providing a separate teppanyaki and a separate griddle.

The cooking surfaces used for teppanyaki grills commonly are more durable than cooking surfaces of traditional griddles, which typically have a softer, less durable, and easily scratched surface, such as a Teflon coating. However, the teppanyaki grill surfaces commonly are more expensive. Thus, cooking surfaces similar to those of teppanyaki grills ordinarily are not used for griddles because of the undesirable increase in manufacturing costs. However, by providing an abuse resistant cooking surface of a tappenyaki grill for a cooking surface that can selectively be used as a griddle, the present invention can provide a combination griddle and teppanyaki cooking unit having a large teppanyaki style abuse resistant cooking surface that can be cooked-on and scraped with a metal spatula or blade if desired. In this way, a metal spatula can be used for flipping food on the combination griddle and teppanyaki cooking unit without fear of scratching or damaging the coating of the griddle, or for scraping the surface of the combination griddle and teppanyaki cooking unit clean after cooking.

On the other hand, teppanyaki grills for home use commonly do not include a grease/waste collection device. By providing a combination griddle and teppanyaki cooking unit having a grease tray, the present invention may improve the usability of the teppanyaki mode of the cooking unit.

As explained above, an example of a combination griddle and teppanyaki cooking unit according to the invention can include a large teppanyaki style abuse resistant cooking surface that can be cooked-on and scraped with a metal spatula or blade if desired. The combination griddle and teppanyaki cooking unit can include a plurality of burners or heating elements under the cooking surface that are selectively controllable by a user such that heat can be either concentrated towards a central region (e.g., a circular central region) of the cooking surface, for example in a teppanyaki mode, or such that heat can be evenly distributed across the whole surface, for example, in a griddle mode.

The heating elements can include one or more electric heating elements or one or more gas burners. In other embodiments, the heating elements can include a combination of both electric heating elements and gas burners. For example, the cooking unit can include a round center burner and two tube burners disposed on opposite sides of the center burner. The round center burner can be selectively operated in a teppanyaki mode, which concentrates heat in a central region (e.g., a circular central region) of the cooking surface, while the round center burner and two tube burners can be selectively operated in a griddle mode, which evenly distributes heat across the whole surface of the cooking surface.

In this way, the present invention provides a combination griddle and teppanyaki cooking unit that can selectively be used as a griddle that provides even heat across the entire cooking surface and may be adjustable, for example, between temperatures ranging from approximately 200° F. to 500° F., which may be particularly suited for cooking large quantities of food which would otherwise be pan fried, such as eggs, bacon, sausage, pancakes, quesadillas, etc.

Additionally, the present invention provides a combination griddle and teppanyaki cooking unit that can selectively be used as a teppanyaki grill having, for example, a virtually indestructible surface made of, for example, stainless steel, hard chrome, or some other temperature and scratch resistant material. The combination griddle and teppanyaki cooking unit can provide concentrated heat at the center (e.g., at a circular central region) of the cooking surface with gradually decreasing temperatures towards the edges of the cooking surface. For example, an exemplary embodiment can be configured such that a centrally located heating element heats a conductive cooking surface, such as a metal, stainless steel, or hard chrome cooking surface, which conducts the heat outward away from the heating element in order to provide a temperature gradient extending from a center of the cooking surface toward the edges of the cooking surface without defined heating zones.

In this way, the exemplary embodiments of the present invention provide a combination griddle and teppanyaki cooking unit for a household appliance that increases surface cooking flexibility while eliminating the need to limit the appliance to one or the other of a griddle or a teppanyaki grill or to devote space in the appliance to multiple cooking units or modules for providing a separate griddle and teppanyaki grill. Furthermore, the present invention provides flexible cooking options from a single cooking unit, thereby saving space in the kitchen compared to having two separate cooking appliance dedicated to each type of cooking, or saving space on the cooking appliance compared to having two separate cooking units on the appliance being dedicated to each type of cooking. The present invention also provides a single solution or option for users who desire either a griddle or a teppanyaki grill, or both, thereby reducing complexity in manufacturing household cooking appliances, for example, by reducing a number of different models of appliances needed to offer the griddle and teppanyaki grill operations.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

Figure 1:
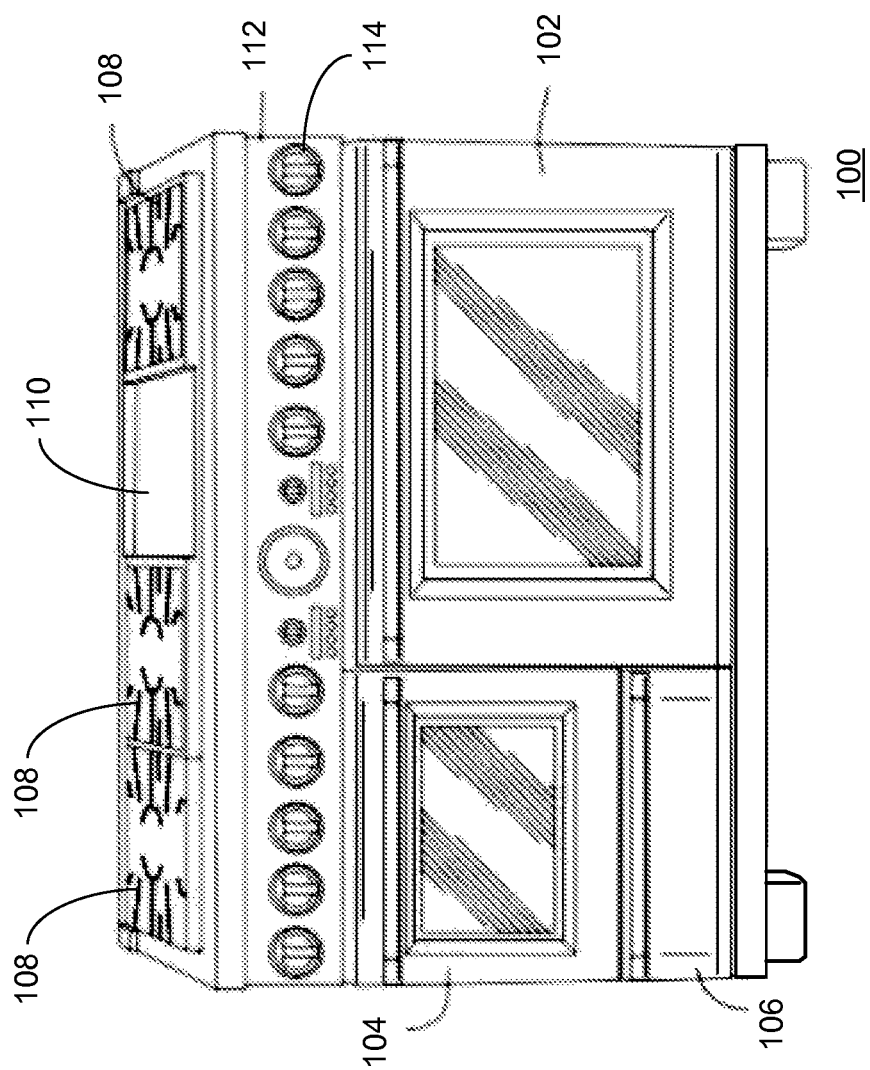
FIG. 1 is a front view of a household cooking appliance according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-6 illustrate exemplary embodiments of a combination griddle and teppanyaki cooking unit for a household appliance, a surface cooking module having such a combination griddle and teppanyaki cooking unit, a household cooking appliance having a combination griddle and teppanyaki cooking unit, and a countertop combination griddle and teppanyaki cooking unit.

Examples of household cooking appliances will first be described with reference to FIGS. 1 and 2.

Figure 2:
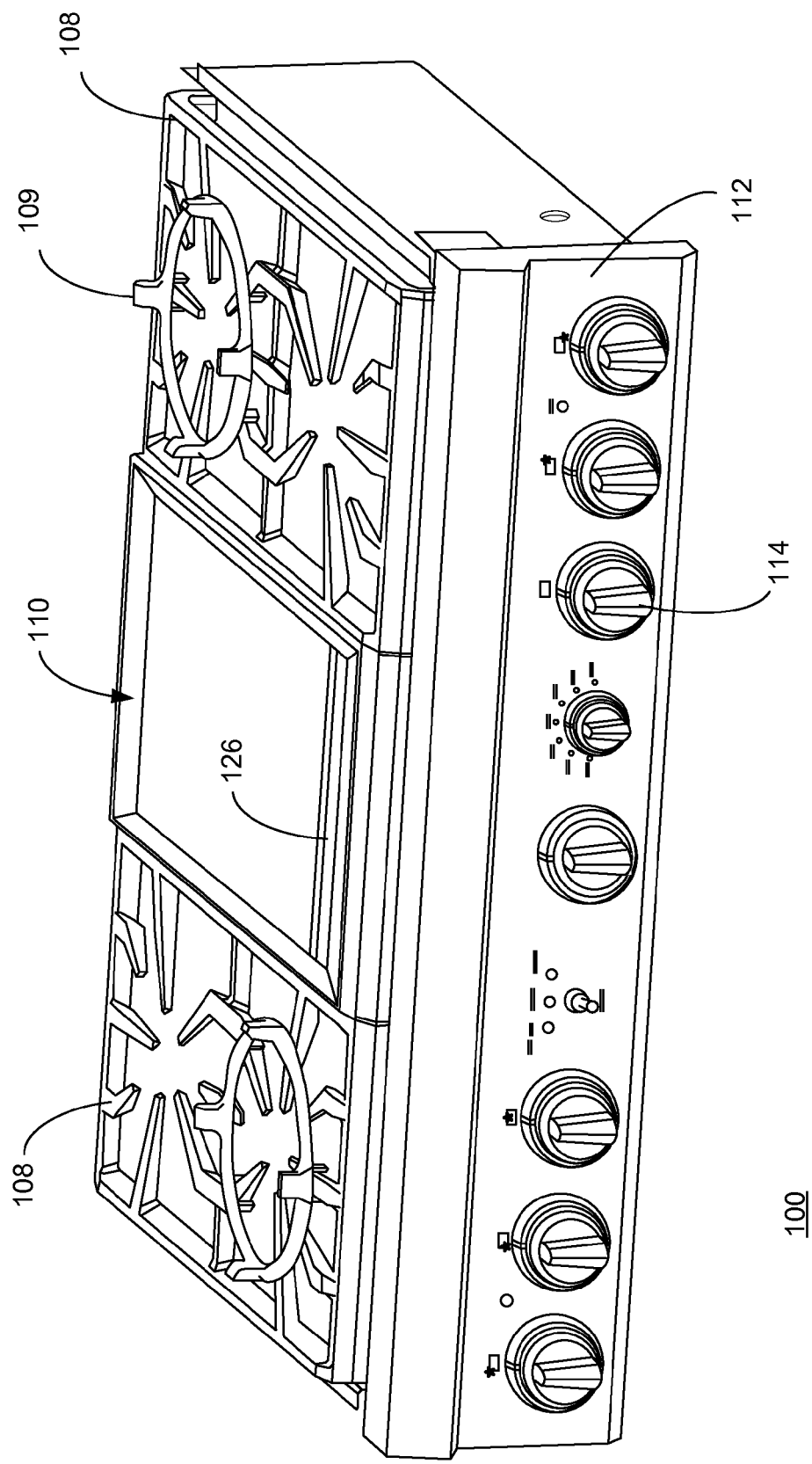
FIG. 2 is a perspective view of a range top having a cooking module according to an exemplary embodiment of the invention.

FIG. 1 illustrates an example of a household cooking appliance 100. In the example appliance of FIG. 1, the household cooking appliance 100 includes one or more of an oven 102 (e.g., baking oven or convection oven), a steam oven 104, and a warming drawer 106. The household cooking appliance 100 can include a control panel 112 having one or more control devices 114, such as control knobs, for controlling one or more components or modules of the appliance. Other arrangements and features are possible, such as a single oven range, a cooktop, among other arrangements. The appliance 100 can be a stand-alone appliance, a built-in appliance, or in-counter appliance. For example, FIG. 2 illustrates an example of a household cooking appliance 100 including a range top, which can be part of a stand-alone appliance or can be built-in to a counter.

A household cooking appliance 100 can include one or more gas burners 108 or induction heating elements (not shown), and/or one or more cooktop cooking modules 110, such as one or more of a griddle, a grill, an induction heating element, a teppanyaki grill, a rotisserie, a surface steamer bay, a wok burner, a deep fryer (e.g., deep fat fryer), or the like, as well as various accessories to such cooking devices. FIGS. 1 and 2 show examples of household cooking appliances 100 having a single cooking unit or module 110 in combination with one or more gas burners 108. However, in other embodiments, the appliance 100 can include one or more modules arranged in the appliance. The number of modules is not limited to any particular number and can include any number of modules based on the size of the appliance 100 and the size and shape of the respective modules. In other embodiments, the appliance 100 can be formed entirely from a plurality of modules 110 and without providing gas burners 108. The modules 110 can be uniformly sized and shaped modules. However, in other embodiments, the modules 110 can have different sizes and shapes. The cooking unit or module 110 can include a grease/waste collection device 126, which will be described in greater detail below with reference to FIGS. 5 and 6. The household cooking appliance 100 can include various accessories for cooking, such as a wok ring 109, a griddle cover, a chopping block, etc.

Figure 3:
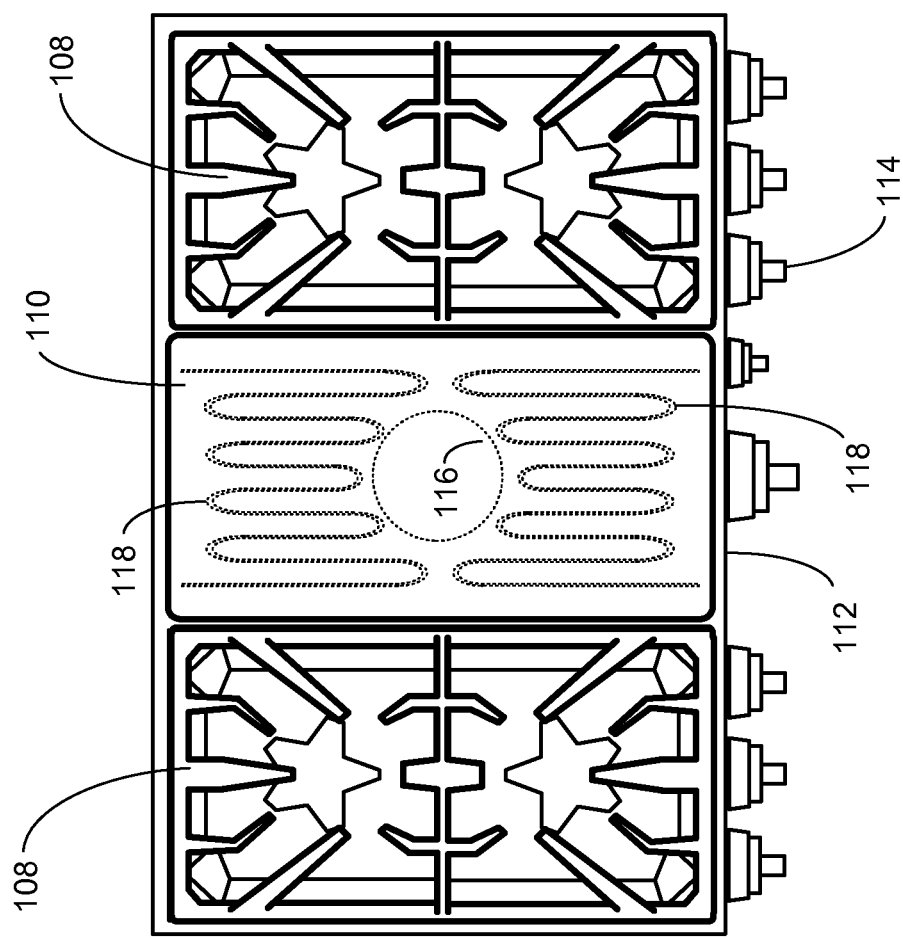
FIG. 3 is a top view of a range top having a cooking module according to an exemplary embodiment of the invention.
Figure 4:
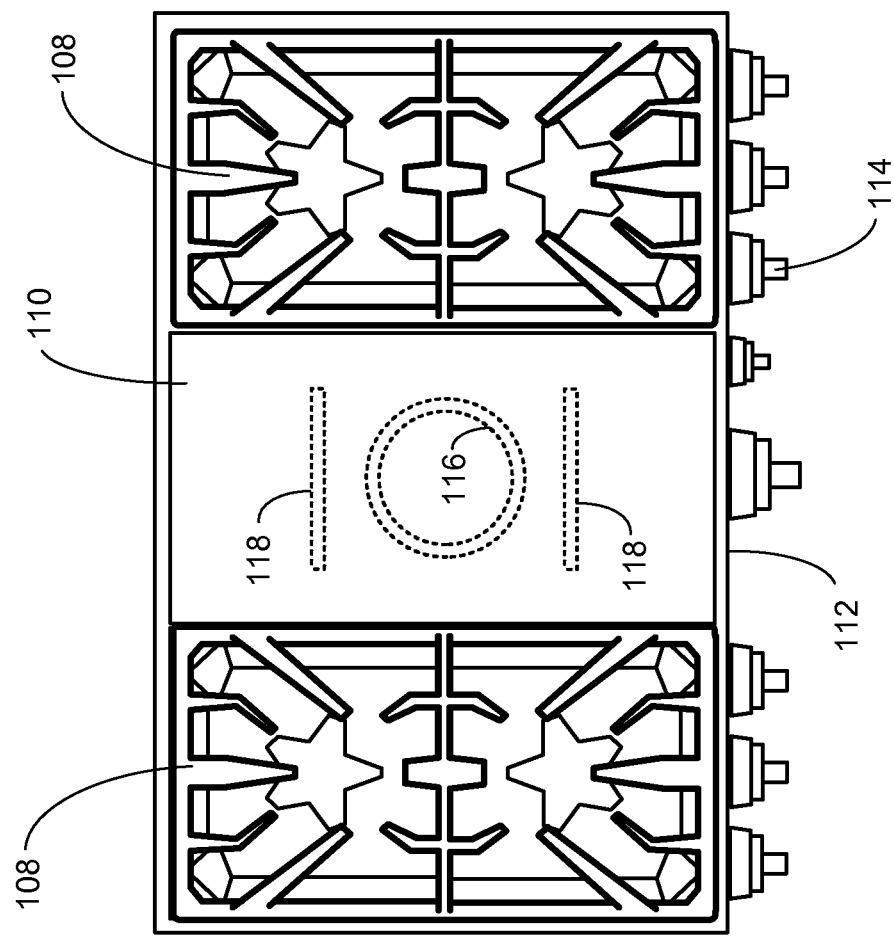
FIG. 4 is a top view of a range top having a cooking module according to an exemplary embodiment of the invention.

With reference to the examples illustrated in FIGS. 3 and 4, a household cooking appliance 100 can include gas burners 108 and a cooking unit or module (i.e., a combination griddle and teppanyaki cooking unit) 110, which selectively can be operated as either a griddle or a teppanyaki grill. The combination griddle and teppanyaki cooking unit 110 can include a large teppanyaki style abuse resistant cooking surface that can be cooked on and scraped with a metal spatula or blade if desired. The combination griddle and teppanyaki cooking unit 110 can include a plurality of burners or heating elements 116, 118 under the cooking surface that are selectively controllable by a user such that heat can be either concentrated towards a central region (e.g., a circular central region) of the cooking surface, for example in a teppanyaki mode, or such that heat can be evenly distributed across the whole surface, for example, in a griddle mode.

For example, the household cooking appliance 100 can include one or more control knobs 114 for controlling the operation of the combination griddle and teppanyaki cooking unit 110. More particularly, in an example, the household cooking appliance 100 can include a single control knob 114 that selectively controls a teppanyaki mode of the combination griddle and teppanyaki cooking unit 110 when the knob 114 is turned in a first direction and a griddle mode of the combination griddle and teppanyaki cooking unit 110 when the knob 114 is turned in a second direction that is opposite the first direction. In this way, the control knob can be used to control the combination griddle and teppanyaki cooking unit 110 such that heat can be either concentrated towards a central region (e.g., a circular central region) of the cooking surface, for example in the teppanyaki mode, or such that heat can be evenly distributed across the whole surface, for example, in the griddle mode. In another embodiment, the household cooking appliance 100 can include one or more control knobs 114 for controlling the operation of the combination griddle and teppanyaki cooking unit 110. More particularly, in this example, the household cooking appliance 100 can include more than one control knob 114 for selectively controlling the teppanyaki mode and a griddle mode of the combination griddle and teppanyaki cooking unit 110, for example, by controlling one knob for the teppanyaki mode and another knob for the griddle mode of the combination griddle and teppanyaki cooking unit 110. In yet another example, the household cooking appliance 100 can include multiple knobs 114 for the teppanyaki mode and/or the griddle mode to provide, for example, more flexibility to the user in setting temperatures across the cooking surface or in particular areas or zones of the cooking surface. In another exemplary embodiment, the household cooking appliance 100 can include a controller (not shown) that controls the operation of one or more of the heating elements to regulate the temperature of all or a portion of the cooking surface in either or both of the teppanyaki mode or the griddle mode to provide, for example, more flexibility to the user in setting temperatures across the cooking surface or in particular areas or zones of the cooking surface, while also simplifying the temperature setting process for the user.

The heating elements 116, 118 can include one or more electric heating elements, as shown for example in FIG. 3, or one or more gas burners, as shown for example in FIG. 4. In other embodiments, the heating elements 116, 118 can include a combination of both electric heating elements and gas burners.

As shown in the example in FIG. 3, a first electric heating element 116 can be configured as a circular electric heating element arranged in a central or middle region of the cooking surface of the cooking unit 110, and more particularly in a center of the cooking surface of the cooking unit 110. A second electric heating element 118, and more particularly a second set of electric heating elements 118, can be arranged around the circular electric heating element 116 or on opposite sides of the circular electric heating element 116. In other exemplary embodiments, the second electric heating element 118 can be a single electric heating element that extends around or partially around the first electric heating element 116 on one or more sides of the first electric heating element 116. In the illustrated example of FIG. 3, the second electric heating element 118 has a serpentine arrangement to provide uniform heating over a region of the cooking surface. The dimensions of the serpentine arrangement (e.g., length and spacing between elements of the serpentine arrangement) of the second electric heating element 118 can configured such that the second heating element 118 has a perimeter shape that corresponds to and is adjacent to the perimeter shape of the first heating element 116 such that, for example, the entire area of the cooking surface is uniformly heated when both the first heating element 116 and the second heating element 118 are operated without so-called 'dead spots' of lesser temperature.

As shown in the example in FIG. 4, a first gas burner 116 can be configured as a circular burner arranged in a central or middle region of the cooking surface of the cooking unit 110, and more particularly in a center of the cooking surface of the cooking unit 110. A second gas burner 118, and more particularly a second set of gas burners 118, can be arranged around the circular burner 116 or on opposite sides of the circular burner 116. In other exemplary embodiments, the second gas burner 118 can be a single gas burner that extends around or partially around the first gas burner 116 on one or more sides of the first gas burner 116.

The heating elements 116, 118 are not limited to the illustrated arrangements and can be configured in various arrangements of heating elements, types of heating elements, number of heating elements, size and shape of heating elements. The heating elements 116, 118 can be arranged or configured such that heat can be either concentrated towards a central or middle region of the cooking surface, for example in the teppanyaki mode, or heat can be evenly distributed across the whole surface, for example, in the griddle mode. In other exemplary embodiments, the heating temperatures of the cooking surface can be concentrated in a central or middle region of the cooking surface and/or on one or more additional or alternative regions of the cooking surface, such as for example, a front region, a rear region, a side region, a corner region, etc. In other exemplary embodiments, the heating temperatures of the cooking surface can be gradually reduced or stepped down across the cooking surface in a direction extending away from the center or central region of the cooking surface.

An exemplary combination griddle and teppanyaki cooking unit can selectively be used as a griddle that provides even heat across the entire cooking surface and may be adjustable, for example, between temperatures ranging from approximately 200° F. to 500° F., which may be particularly suited for cooking large quantities of food which would otherwise be pan fried, such as eggs, bacon, sausage, pancakes, quesadillas, etc.

Additionally, a combination griddle and teppanyaki cooking unit can selectively be used as a teppanyaki grill having, for example, a virtually indestructible surface made of, for example, stainless steel, hard chrome, or some other temperature and scratch resistant material. The combination griddle and teppanyaki cooking unit can provide concentrated heat at the center of the cooking surface with gradually decreasing temperatures towards the edges of the cooking surface. For example, an exemplary embodiment can be configured such that a centrally located heating element 116 heats the cooking surface 124 (e.g., a conductive cooking surface such as a metal, stainless steel, or hard chrome cooking surface) without defined heating zones in order to provide a temperature gradient extending from a center of the cooking surface 124 toward the edges of the cooking surface 124. More particularly, in this example, the combination griddle and teppanyaki cooking unit 110 can be configured such that the conductive cooking surface conducts the heat outward away from the heating element 116 in order to provide a temperature gradient extending from a center of the cooking surface 124 toward the edges of the cooking surface 124 without defined heating zones.

Figure 5:
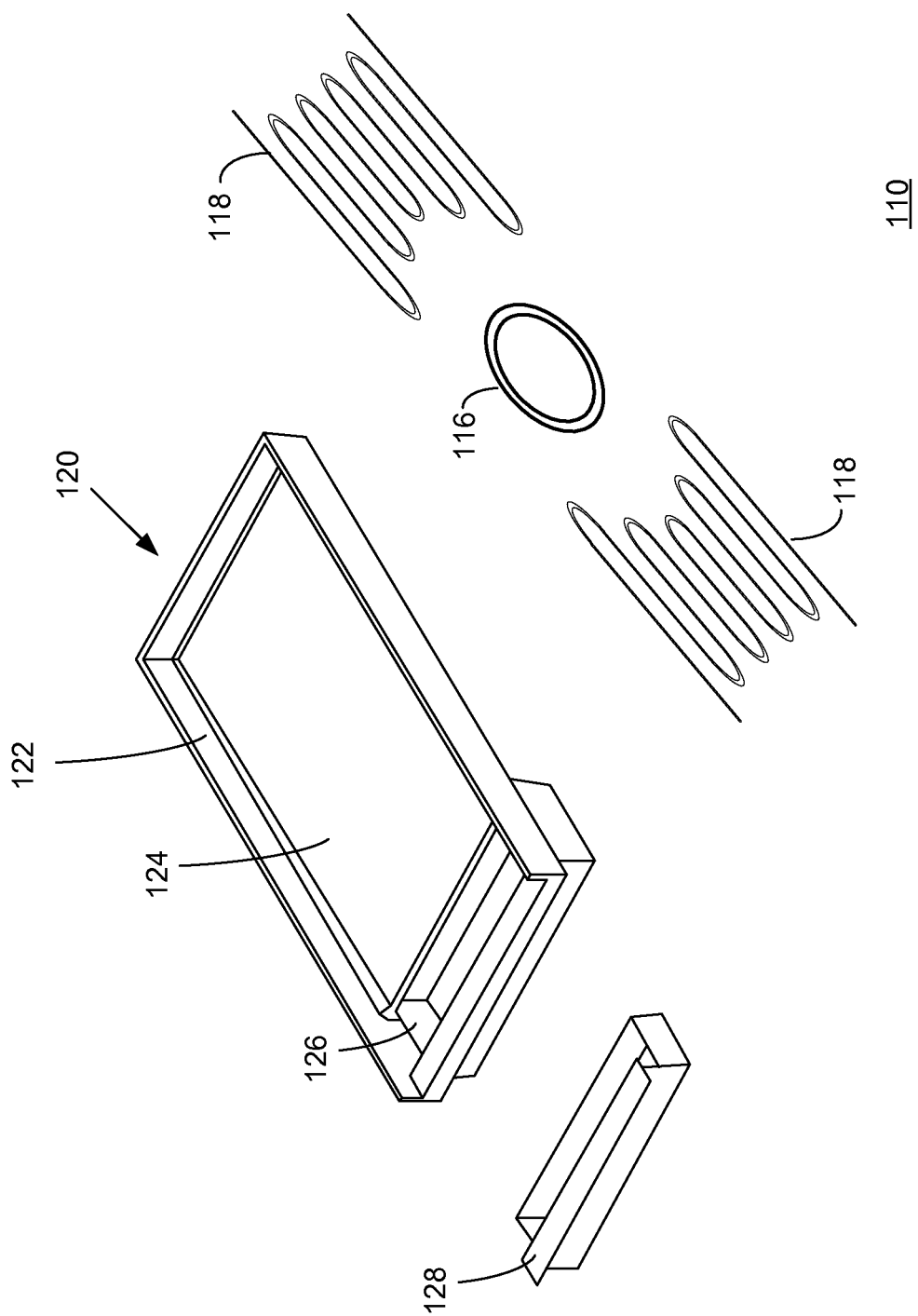
FIG. 5 is a partial exploded view of a cooking module according to the exemplary embodiment of the invention illustrated in FIG. 3.
Figure 6:
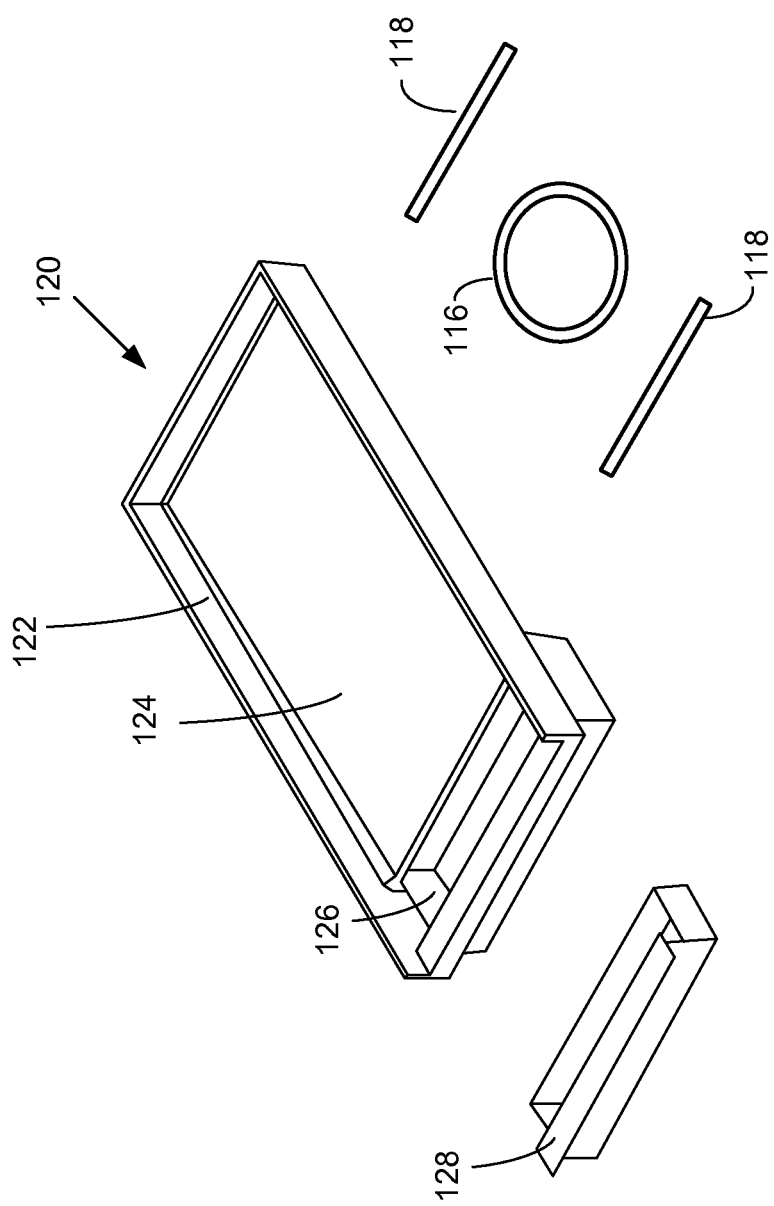
FIG. 6 is a partial exploded view of a cooking module according to the exemplary embodiment of the invention illustrated in FIG. 4.

With reference to FIGS. 5 and 6, the combination griddle and teppanyaki cooking unit 110 can include a surface portion 120 having optional sidewalls 122 and a cooking surface 124. The cooking surface 124 of the cooking unit or module (i.e., combination griddle and teppanyaki cooking unit) 110 used for teppanyaki grills can be more durable than cooking surfaces of traditional griddles, which typically have a softer, less durable, and easily scratched surface, such as a Teflon coating. More particularly, the cooking surface 124 of the combination griddle and teppanyaki cooking unit 110 can be an abuse resistant cooking surface suitable for use with a metal spatula such that the spatula can be used for flipping food on the combination griddle and teppanyaki cooking unit without fear of scratching or damaging the coating of the griddle, or for scraping the surface of the combination griddle and teppanyaki cooking unit clean after cooking.

With reference to FIGS. 5 and 6, the cooking unit 110 can include a grease/waste collection device 126. By providing a combination griddle and teppanyaki cooking unit having a grease/waste collection device 126, the present invention may improve the usability of the teppanyaki mode of the cooking unit 110. The grease/waste collection device 126 can be integrally formed with the cooking unit or module 110, or separately formed from the cooking unit or module 110. For example, the grease/waste collection device 126 can include a removable grease tray 128 such that grease can be collected and then dumped out, as shown in FIGS. 5 and 6.

For purposes of this disclosure, a cooking unit or module 110 can include one or more of a gas burner, a steam oven, a warming drawer, a convection oven, gas burners, a griddle, a grill, an induction heating element, a teppanyaki grill, or the like. The invention is not limited to any particular type of cooking module and other cooking modules, types of cooking modules, arrangements of cooking modules, and combinations of cooking modules are contemplated by the present invention.

In this way, the exemplary embodiments of the present invention provide a combination griddle and teppanyaki cooking unit 110 for a household appliance 100 that increases surface cooking flexibility while eliminating the need to limit the appliance to one or the other of a griddle or a teppanyaki grill or to devote space in the appliance 100 to multiple cooking units or modules for providing a separate griddle and teppanyaki grill. Furthermore, the present invention provides flexible cooking options from a single cooking unit 110, thereby saving space in the kitchen compared to having two separate cooking appliance dedicated to each type of cooking, or saving space on the cooking appliance compared to having two separate cooking units on the appliance being dedicated to each type of cooking. The present invention also provides a single solution or option for users who desire either a griddle or a teppanyaki grill, or both, thereby reducing complexity in manufacturing household cooking appliances 100, for example, by reducing a number of difference models of appliances needed to offer the griddle and teppanyaki grill operations.

In other exemplary embodiments, a combination griddle and teppanyaki cooking unit can include an integral cooking unit of a household appliance, a surface cooking module having such a combination griddle and teppanyaki cooking unit for a household appliance, a household cooking appliance having a combination griddle and teppanyaki cooking unit, and a combination griddle and teppanyaki cooking appliance, such as a small household appliance, including for example a stand-alone countertop cooking unit or other dedicated cooking unit, for example, which may be transportable or easily stowed in a cabinet when the cooking unit is not being used for cooking and moved to a countertop when the cooking unit is to be used for cooking.

For example, an exemplary embodiment includes a combination griddle and teppanyaki household cooking appliance (e.g., stand-alone cooking appliance or countertop cooking appliance) having features that are similar or the same as the features of the cooking module 110 shown in FIGS. 2-6. For example, an exemplary combination griddle and teppanyaki household cooking appliance (e.g., stand-alone cooking appliance or countertop cooking appliance) can include a cooking surface 124, a first heating unit 116 for heating a first portion of the cooking surface 124, and a second heating unit 118 for heating a second portion of the cooking surface 124, wherein the first heating unit 116 and the second heating unit 118 are selectively operable to uniformly heat an entire area of the cooking surface 124 in a griddle mode of operation and to concentrate a greater amount of heat in a first area of the cooking surface 124 than in a second area of the cooking surface 124 and provide a temperature gradient extending outward from the first area of the cooking surface 124 to edges of the cooking surface 124 in a teppanyaki mode of operation.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A combination griddle and teppanyaki cooking unit for a household cooking appliance, the combination griddle and teppanyaki cooking unit comprising:
   a cooking surface;
   a first heating unit for heating a first portion of the cooking surface;
   a second heating unit for heating a second portion of the cooking surface; and
   a controller configured to selectively control one or both of the first heating unit and the second heating unit to provide a griddle mode and a teppanyaki mode, wherein the controller selectively activates and controls the first heating unit and the second heating unit to uniformly heat an entire area of the cooking surface in the griddle mode and selectively activates and controls the first heating unit or the second heating unit to concentrate a greater amount of heat in a first area of the cooking surface than in a second area of the cooking surface in the teppanyaki mode.

2. The combination griddle and teppanyaki cooking unit of claim 1, wherein the first heating unit and the second heating unit are selectively operable by the controller such that the first heating unit is turned on while the second heating unit is turned on in the griddle mode, and
   wherein the first heating unit and the second heating unit are selectively operable by the controller such that the first heating unit is turned on while the second heating unit is turned off in the teppanyaki mode.

3. The combination griddle and teppanyaki cooking unit of claim 1, wherein the cooking surface includes an abuse resistant surface.

4. The combination griddle and teppanyaki cooking unit of claim 1, wherein the first heating unit includes a first gas burner and the second heating unit includes a second gas burner.

5. The combination griddle and teppanyaki cooking unit of claim 1, wherein the first heating unit includes a first gas burner arranged in a central region of the cooking surface in the teppanyaki mode and the second heating unit includes a plurality of second gas burners arranged around or on opposite sides of the first gas burner in the griddle mode.

6. The combination griddle and teppanyaki cooking unit of claim 1, wherein the first heating unit includes a first electric heating element and the second heating unit includes a second electric heating element.

7. The combination griddle and teppanyaki cooking unit of claim 1, wherein the first heating unit includes a first electric heating element arranged in a central region of the cooking surface in the teppanyaki mode and the second heating unit includes a plurality of second electric heating elements arranged around or on opposite sides of the first electric heating element in the griddle mode.

8. The combination griddle and teppanyaki cooking unit of claim 1, wherein the first heating unit includes an electric heating element and the second heating unit includes a gas burner.

9. The combination griddle and teppanyaki cooking unit of claim 1, further comprising:
a control knob that selectively activates and controls the first heating unit and not the second heating unit when the knob is turned from an off position in a first direction in the teppanyaki mode and both the first heating unit and the second heating unit when the knob is turned from an off position in a second direction that is opposite the first direction in the griddle mode.

10. The combination griddle and teppanyaki cooking unit of claim 1, wherein the first area of the cooking surface is a central region of the cooking surface.

11. The combination griddle and teppanyaki cooking unit of claim 1, wherein the first area of the cooking surface is a circular central region of the cooking surface.

12. A household cooking appliance comprising:
a chassis; and
the combination griddle and teppanyaki cooking unit of claim 1 on the chassis.

13. The household cooking appliance of claim 12, wherein the controller controls the first heating unit and the second heating unit such that the first heating unit is turned on while the second heating unit is turned on in the griddle mode, and
wherein the controller controls the first heating unit and the second heating unit such that the first heating unit is turned on while the second heating unit is turned off in the teppanyaki mode.

14. The household cooking appliance of claim 12, wherein the cooking surface includes an abuse resistant surface.

15. The household cooking appliance of claim 12, wherein the first heating unit includes a first gas burner and the second heating unit includes a second gas burner.

16. The household cooking appliance of claim 12, wherein the first heating unit includes a first gas burner arranged in a central region of the cooking surface in the teppanyaki mode and the second heating unit includes a plurality of second gas burners arranged around or on opposite sides of the first gas burner in the griddle mode.

17. The household cooking appliance of claim 12, wherein the first heating unit includes a first electric heating element and the second heating unit includes a second electric heating element.

18. The household cooking appliance of claim 12, wherein the first heating unit includes a first electric heating element arranged in a central region of the cooking surface in the teppanyaki mode and the second heating unit includes a plurality of second electric heating elements arranged around or on opposite sides of the first electric heating element in the griddle mode.

19. The household cooking appliance of claim 12, wherein the first heating unit includes an electric heating element and the second heating unit includes a gas burner.

20. The household cooking appliance of claim 12, further comprising:
a control knob on the combination griddle and teppanyaki cooking unit, the control knob selectively activating and controlling the first heating unit and not the second heating unit when the knob is turned from an off position in a first direction in the teppanyaki mode and activating and controlling both the first heating unit and the second heating unit when the knob is turned from the off position in a second direction that is opposite the first direction in the griddle mode.

21. The household cooking appliance of claim 12, further comprising:
a control panel on the chassis; and
a control knob on the control panel, the control knob selectively activating and controlling the first heating unit and not the second heating unit when the knob is turned from an off position in a first direction in the teppanyaki mode and activating and controlling both the first heating unit and the second heating unit when the knob is turned from the off position in a second direction that is opposite the first direction in the griddle mode.

22. The household cooking appliance of claim 12, wherein the first area of the cooking surface is a central region of the cooking surface.

23. The household cooking appliance of claim 12, wherein the first area of the cooking surface is a circular central region of the cooking surface.

24. A combination griddle and teppanyaki household cooking appliance comprising:
a cooking surface;
a first heating unit for heating a first portion of the cooking surface;
a second heating unit for heating a second portion of the cooking surface; and
a controller that selectively activates one or both of the first heating unit and the second heating unit to provide a griddle mode and a teppanyaki mode, wherein the controller selectively activates and controls the first heating unit and the second heating unit to uniformly heat an entire area of the cooking surface in the griddle mode and selectively activates and controls the first heating unit or the second heating unit to concentrate a greater amount of heat in a first area of the cooking surface than in a second area of the cooking surface and provide a temperature gradient extending outward from the first area of the cooking surface to edges of the cooking surface in the teppanyaki mode.

25. A combination griddle and teppanyaki cooking unit for a household cooking appliance, the combination griddle and teppanyaki cooking unit comprising:
- a cooking surface;
- a first heating unit for heating a first portion of the cooking surface;
- a second heating unit for heating a second portion of the cooking surface;
- at least one control knob; and
- a controller that selectively activates the first and second heating units individually and in combination with each other in a griddle mode and a teppanyaki mode, wherein the controller selectively activates and controls the first and second heating units such that the first and second heating units heat the cooking surface: 1) concentrated in areas in the teppanyaki mode; and 2) uniformly, across the first and second portions of the cooking surface in the griddle mode, in response to user settings of the at least control knob.

26. The combination griddle and teppanyaki cooking unit of claim 1, wherein the first heating unit includes a circular gas burner arranged in a central region of the cooking surface to concentrate a greater amount of heat in the first area of the cooking surface than in the second area of the cooking surface in the teppanyaki mode, and
wherein the second heating unit includes at least one additional gas burner arranged around or partially around the circular gas burner on one or more sides of the circular gas burner to uniformly heat the entire area of the cooking surface in the griddle mode.

27. The combination griddle and teppanyaki cooking unit of claim 1, wherein the first heating unit includes a circular electric heating element arranged in a central region of the cooking surface to concentrate a greater amount of heat in the first area of the cooking surface than in the second area of the cooking surface in the teppanyaki mode, and
wherein the second heating unit includes at least one serpentine electric heating element arranged around or on opposite sides of the circular electric heating element to uniformly heat the entire area of the cooking surface in the griddle mode.

28. The combination griddle and teppanyaki cooking unit of claim 1, wherein the first heating unit includes a circular electric heating element arranged in a central region of the cooking surface to concentrate a greater amount of heat in the first area of the cooking surface than in the second area of the cooking surface in the teppanyaki mode, and
wherein the second heating unit includes at least one gas burner arranged around or partially around the circular electric heating element on one or more sides of the circular electric heating element to uniformly heat the entire area of the cooking surface in the griddle mode.

29. The combination griddle and teppanyaki cooking unit of claim 1, wherein the first heating unit includes a circular gas burner arranged in a central region of the cooking surface to concentrate a greater amount of heat in the first area of the cooking surface than in the second area of the cooking surface in the teppanyaki mode, and
wherein the second heating unit includes at least one serpentine electric heating element arranged around or on opposite sides of the circular gas burner to uniformly heat the entire area of the cooking surface in the griddle mode.

30. The combination griddle and teppanyaki cooking unit of claim 1, wherein the first heating unit includes a first electric heating element arranged in a central region of the cooking surface and not in perimeter region of the cooking surface in the teppanyaki mode, and
wherein the second heating unit includes a plurality of second electric heating elements arranged around or on opposite sides of the first electric heating element and not in the central region of the cooking surface in the griddle mode.

* * * * *